US012340198B2

(12) United States Patent
Hykes et al.

(10) Patent No.: US 12,340,198 B2
(45) Date of Patent: Jun. 24, 2025

(54) AUTOMATED APPLICATION DEPLOYMENT

(71) Applicant: Dagger, Inc., Belmont, CA (US)

(72) Inventors: Solomon Hykes, San Francisco, CA (US); Andrea Luzzardi, San Francisco, CA (US); Erik Sipsma, Seattle, WA (US); Sam Alba, Belmont, CA (US)

(73) Assignee: Dagger, Inc., Belmont, CA (US)

( * ) Notice: Subject to any disclaimer, the term of this patent is extended or adjusted under 35 U.S.C. 154(b) by 18 days.

(21) Appl. No.: 18/178,004

(22) Filed: Mar. 3, 2023

(65) Prior Publication Data

US 2024/0078101 A1    Mar. 7, 2024

Related U.S. Application Data

(60) Provisional application No. 63/402,669, filed on Aug. 31, 2022.

(51) Int. Cl.
*G06F 9/44* (2018.01)
*G06F 8/61* (2018.01)
(Continued)

(52) U.S. Cl.
CPC .................. *G06F 8/61* (2013.01); *G06F 8/77* (2013.01); *G06F 9/45508* (2013.01); *G06F 9/547* (2013.01)

(58) Field of Classification Search
None
See application file for complete search history.

(56) References Cited

U.S. PATENT DOCUMENTS 10,120,670 B1 * 11/2018 Atkinson .................. G06F 8/71
10,339,332 B1 *  7/2019 Bendory ................. G06F 8/447
(Continued)

FOREIGN PATENT DOCUMENTS

KR    1020150045471 A    4/2015

OTHER PUBLICATIONS

Programster's Blog, "Getting Started With Docker BuildKit In Order To Safely Use A Private SSH Key During A Build", Oct. 2011 (Year: 2011).*

(Continued)

*Primary Examiner* — Bradley A Teets
*Assistant Examiner* — Lanny N Ung
(74) *Attorney, Agent, or Firm* — Baker Botts L.L.P.

(57) ABSTRACT

In one embodiment, a computer-implemented method comprises using a script automation processor that is hosted using a virtual compute instance and a virtual storage instance associated with one or more second non-transitory computer-readable storage media storing one or more second sequences of instructions defining an API implementation of the API, a graph server, and one or more programming language runtime interpreters, receiving a user pipeline automation script comprising one or more first sequences of instructions specifying one or more API calls to an application programming interface (API), and a user application; using the script automation processor, creating and storing one or more programmatic containers in memory of the script automation processor, the containers corresponding to functions that user pipeline automation script and user application invoke; using the script automation processor, creating and storing a directed acyclic graph (DAG) in the memory of the script processor, the DAG comprising nodes and edges corresponding to dependencies of the containers; using the script automation processor, interpreting the user pipeline automation script using a particular programming language runtime interpreter among the one or more programming language runtime interpreters; using the script automation processor, running the user pipeline automation script to automatically build, test, or deploy the user application in a cloud computing service.

30 Claims, 5 Drawing Sheets

(51) Int. Cl.
  *G06F 8/77* (2018.01)
  *G06F 9/455* (2018.01)
  *G06F 9/54* (2006.01)

(56) References Cited

U.S. PATENT DOCUMENTS

| | | | |
|---|---|---|---|
| 10,768,835 B1* | 9/2020 | Watson | G06F 3/0608 |
| 11,762,760 B1* | 9/2023 | Fost | G06F 11/3692 |
| | | | 717/124 |
| 2010/0060643 A1 | 3/2010 | Kolipaka et al. | |
| 2011/0239194 A1 | 9/2011 | Braude | |
| 2014/0215439 A1 | 7/2014 | Krishnan et al. | |
| 2015/0135165 A1* | 5/2015 | Simernitski | G06F 11/3664 |
| | | | 717/124 |
| 2016/0321170 A1 | 11/2016 | Ellis et al. | |
| 2018/0349149 A1* | 12/2018 | Chute | G06F 9/45529 |
| 2019/0129769 A1 | 5/2019 | Frech | |
| 2020/0226140 A1 | 7/2020 | Tamjidi et al. | |
| 2020/0301674 A1 | 9/2020 | Swope et al. | |
| 2021/0019194 A1* | 1/2021 | Bahl | H04L 67/1031 |
| 2022/0129301 A1* | 4/2022 | Adeyenuwo | G06F 9/4843 |
| 2023/0019354 A1 | 1/2023 | Lowin et al. | |
| 2023/0065530 A1* | 3/2023 | Mohanty | G06F 11/3068 |
| 2023/0244740 A1* | 8/2023 | Sable | H04L 67/568 |
| | | | 709/203 |

OTHER PUBLICATIONS

Extended European Search Report for EP23170116.0, dated Jan. 17, 2024, 9 pages.
International Searching Authority, International Search Report and Written Opinion for International Application No. PCT/US2023/022040 mailed Aug. 24, 2023, 9 pages.
Dagger, "Run Pipelines from the Command Line", <https://docs.dagger.io/cli/389936/run-pipelines-cli/>, retrieved May 25, 2023, 8 pages.
Dagger, "Dagger Documentation", <https://docs.dagger.io/#how-does-it-work>, retrieved May 25, 2023, 4 pages.
Dagger, "Get Started with the Dagger Node.js SDK", <https://docs.dagger.io/sdk/nodejs/783645/get-started/>, retrieved May 25, 2023, 10 pages.
Dagger, "Get Started with the Dagger Python SDK", <https://docs.dagger.io/sdk/python/628797/get-started/>, retrieved May 25, 2023, 11 pages.
Dagger, "Get Started with the Dagger Go SDK", <https://docs.dagger.io/sdk/go/959738/get-started/#step-4-create-a-single-build-pipeline>, retrieved May 25, 2023, 14 pages.
Docker Inc., "Overview of Docker Build", <https://docs.docker.com/build/>, retrieved May 25, 2023, 3 pages.
Simin Baharlou, International Preliminary Report on Patentablity for Application No. PCT/US2023/022040, mailed Mar. 13, 2025, 6 pages, pub. by The International Bureau of WIPO, Geneva, Switzerland.

* cited by examiner

AUTOMATED APPLICATION DEPLOYMENT

BENEFIT CLAIM

This application claims the benefit of provisional application 63/402,669, filed Aug. 31, 2022, the entire contents of which are hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 Dagger, Inc.

TECHNICAL FIELD

One technical field of the present disclosure is computer-implemented methods of deploying computer program applications to distributed computing systems, including cloud-based virtual computing accounts and instances. Another technical field is program-controlled computer process pipeline automation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Professional software engineering tools have rapidly increased the pace at which computer program applications can be written, debugged, and completed. However, moving applications from development systems to production systems, with the correct configuration of access permissions, compute instances, storage instances, and database connections continue to be difficult. When developers arrange applications using micro-services that run in programmatic containers, the management of containers adds a layer of complexity. For example, if an application uses one hundred containers, and a developer changes one application segment that is associated with one container having intertwined dependencies upon a dozen other containers, careful change management is required to determine which containers must be redeployed without the time and trouble of redeploying all the containers. When many containers are in play, container management rapidly becomes untenable.

The series of machine steps required to move a completed application to a deployment environment can be termed a pipeline. Developers seek to automate the creation and operation of pipelines. Today, pipeline automation typically requires the laborious authoring of scripts that a script interpreter, command-line interpreter, or shell can interpret and act upon. Examples include Bash scripts and Python scripts. Some cloud services offer platform-specific support, such as MICROSOFT AZURE DEVOPS, AMAZON AWS with YAML, or Cloud Development Kit ("CDK"). A script written for one such platform is incompatible with others, yet developers or management may want to change platforms as pricing changes.

The scripts also tend to be customized and difficult to maintain. They tend to be artisanal and immediately accumulate a technology debt upon creation because of the need to maintain them over time, possibly without the availability of those who wrote them. Further, such scripts tend not to be portable; successful use requires having a compatible shell or language interpreter. When applications have dependencies on specific libraries, utilities, or programs, the script must manage these dependencies. If changes in an application change the dependencies, then the script must change.

In some environments, the business of building software involves various workflows: build, lint, test, generate docs, deploy, release, etc. Each workflow is composed of many inter-connected tasks and must be run frequently. Orchestrating these workflows manually is too time-consuming, so instead, they are automated with scripts. As the project evolves, these scripts tend to cause problems: they stop working, become very slow, or can't be touched because the person who wrote them has left. One approach to this problem is to implement a custom automation platform for the enterprise or for a team. This approach usually is disruptive, requires a large up-front cost, and is time-consuming. In the meantime, scripts are frozen and not updated, and when available, teams must adapt to the new platform and migrate scripts that worked with other systems. Furthermore, pipelines are difficult to audit in present practice to determine errors that occurred during deployment or to identify performance problems.

Based on the foregoing, the referenced technical fields have developed an acute need for better ways to define deployment pipelines, automate deployment pipelines, achieve portability, manage containers, audit pipelines to resolve deployment errors or performance problems, and, in general, simplify and improve the efficiency of application deployment.

SUMMARY

The appended claims may serve as a summary of the invention.

DETAILED DESCRIPTION

Figure 1:
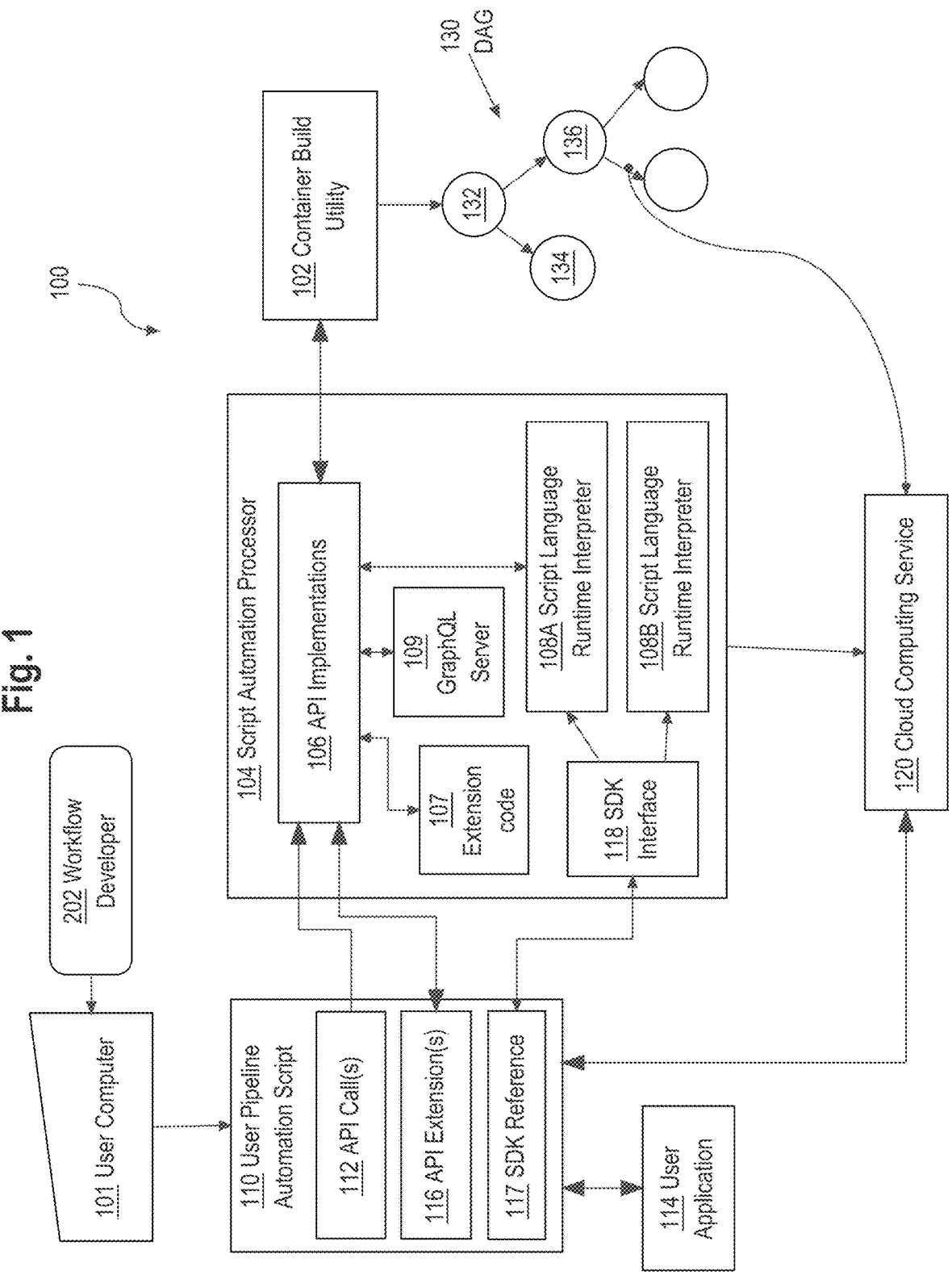
FIG. 1 illustrates a distributed computer system showing the context of use and principal functional elements with which one embodiment could be implemented.

In the following description, for the purposes of explanation, numerous specific details are set forth to provide a thorough understanding of the present invention. It will be apparent, however, that the present invention may be practiced without these specific details. In other instances, wellknown structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs, and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis for interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

Embodiments offer an improved alternative to the approaches described in the Background founded on the concept of incremental evolution: scripts are retained as a means of pipeline automation, but the scripts can be gradually improved by backing them with functions of a script automation processor that are accessible via calls to an application programming interface ("API"). Further, as a script grows, in one embodiment, the developer can segregate the reusable automation logic and can move it to an extension of the API, which becomes available for calling in the original script and processing using the script automation processor in the same manner as other API functions. Consequently, the script can remain small and artisanal, but the API grows, so the API becomes an extended and highly useful platform for developers, teams, or communities, one script at a time. Scripts do not accumulate technical debt to unavailable authors or become bloated and incomprehensible, and teams are not disrupted by attempts to implement a platform to support script use. The API can be architected to avoid the accumulation of technical debt and to use modularization and other techniques to avoid the problems of prior systems.

Using the script automation processor and API implementations of this disclosure, a complete container instantiation and management engine can be effectively embedded in pipeline automation scripts. Substantive script functions can be orchestrated via calls to a GraphQL-based API. Consequently, originally authored pipeline automation scripts can remain compact, by invoking externally implemented functions in API calls. As scripts grow and need to automate more functions, in one embodiment, automation logic can be moved out of the script and into modular extensions that add API calls to the script automation processor. Such pipelines are easy to compose, test, change, and evolve. Scripts can import third-party extensions to avoid recoding functionally similar automation functions. Developers continue to script in a familiar scripting language but can leverage a scalable, extensible API linked to an execution engine, with automatic container management. Whenever script code is spun out to an extension, the developer incrementally creates an ever more powerful platform, without having to interrupt script development to create a standalone platform at a high front-end cost. Instead, the platform creates itself, in an evolutionary or incremental manner.

Embodiments encompass the subject matter of the following numbered clauses:

1. A computer system comprising: a user computer comprising a first processor coupled to one or more first non-transitory computer-readable storage media storing a user pipeline automation script comprising one or more first sequences of instructions specifying one or more API calls to an application programming interface (API), and a user application, wherein the user computer is coupled directly or indirectly via one or more networks to a script automation processor and a cloud computing service; wherein the script automation processor is hosted using a virtual compute instance and a virtual storage instance associated with one or more second non-transitory computer-readable storage media storing one or more second sequences of instructions defining an API implementation of the API, a graph server, and one or more programming language runtime interpreters, and which, when executed using the virtual compute instance, cause the virtual compute instance to execute: creating and storing one or more programmatic containers in memory of the script automation processor, the containers corresponding to functions that user pipeline automation script and user application invoke; creating and storing a directed acyclic graph (DAG) in the memory of the script processor, the DAG comprising nodes and edges corresponding to dependencies of the containers; interpreting the user pipeline automation script using a particular programming language runtime interpreter among the one or more programming language runtime interpreters; running the user pipeline automation script to automatically build, test, or deploy the user application in the cloud computing service.

2. The computer system of clause 1, the script automation processor further comprising the second sequences of instructions which, when executed using the virtual compute instance, cause the virtual compute instance to execute the running by executing one or more GraphQL queries against the API implementation.

3. The computer system of clause 1, the script automation processor further comprising two or more programming language runtime interpreters, wherein each programming language runtime interpreter among the two or more programming language runtime interpreters is programmed to interpret a different programming language used in the user pipeline automation script.

4. The computer system of clause 1, wherein the user pipeline automation script further comprises the first sequences of instructions specifying one or more API extensions; wherein the script automation processor further comprises the second sequences of instructions which, when executed using the virtual compute instance, cause the virtual compute instance to execute: installing the one or more API extensions in association with the API implementation; during the running, based on the user pipeline automation script, invoking one or more of the one or more API extensions as part of automatically building, testing, or deploying the user application in the cloud computing service.

5. The computer system of clause 4, further comprising executing each of the one or more API extensions in a sandboxed region of the main memory of the script automation processor.

6. The computer system of clause 4, each of the one or more API extensions comprising sequences of instructions that are executable as part of the API implementation to interoperate with any one or more of Yarn, Netlify, Git, OCI, Vecel, and Alpine Linux.

7. The computer system of clause 1, wherein each of the creating and storing comprises invoking a container build utility.

8. The computer system of clause 1, wherein the user pipeline automation script further comprises a workflow configuration in a markup language.

9. The computer system of clause 1, wherein the user pipeline automation script further comprises at least one reference to a software development kit (SDK), and wherein the script automation processor comprises an SDK interface responsive to function invocations via the at least one reference.

10. The computer system of clause 1, wherein the SDK is programmed to run one or more of Go, Python, Javascript, Typescript, and Bash to generate one or more client stubs of a build workflow.

11. A computer-implemented method comprising: using a script automation processor that is hosted using a virtual compute instance and a virtual storage instance associated with one or more second non-transitory computer-readable storage media storing one or more second sequences of instructions defining an API implementation of the API, a graph server, and one or more programming language runtime interpreters, receiving a user pipeline automation script comprising one or more first sequences of instructions specifying one or more API calls to an application programming interface (API), and a user application; using the script automation processor, creating and storing one or more programmatic containers in memory of the script automation processor, the containers corresponding to functions that user pipeline automation script and user application invoke; using the script automation processor, creating and storing a directed acyclic graph (DAG) in the memory of the script processor, the DAG comprising nodes and edges corresponding to dependencies of the containers; using the script automation processor, interpreting the user pipeline automation script using a particular programming language runtime interpreter among the one or more programming language runtime interpreters; using the script automation processor, running the user pipeline automation script to automatically build, test, or deploy the user application in a cloud computing service.

12. The computer-implemented method of clause 11, further comprising, using the script automation processor, running the user pipeline automation script by executing one or more GraphQL queries against the API implementation.

13. The computer-implemented method of clause 11, the script automation processor further comprising two or more programming language runtime interpreters, wherein each programming language runtime interpreter among the two or more programming language runtime interpreters is programmed to interpret a different programming language used in the user pipeline automation script.

14. The computer-implemented method of clause 11, wherein the user pipeline automation script further comprises the first sequences of instructions specifying one or more API extensions, the method further comprising, using the script automation processor, installing the one or more API extensions in association with the API implementation, and during the running, based on the user pipeline automation script, invoking one or more of the one or more API extensions as part of automatically building, testing, or deploying the user application in the cloud computing service.

15. The computer-implemented method of clause 14, further comprising executing each of the one or more API extensions in a sandboxed region of the main memory of the script automation processor.

16. The computer-implemented method of clause 14, each of the one or more API extensions comprising sequences of instructions that are executable as part of the API implementation to interoperate with any one or more of Yarm, Netlify, Git, OCI, Vecel, and Alpine Linux.

17. The computer-implemented method of clause 11, wherein each of the creating and storing comprises invoking a container build utility.

18. The computer-implemented method of clause 11, wherein the user pipeline automation script further comprises a workflow configuration in a markup language.

19. The computer-implemented method of clause 11, wherein the user pipeline automation script further comprises at least one reference to a software development kit (SDK), and wherein the script automation processor comprises an SDK interface responsive to function invocations via the at least one reference.

20. The computer-implemented method of clause 11, wherein the SDK is programmed to run one or more of Go, Python, Javascript, Typescript, and Bash to generate one or more client stubs of a build workflow.

21. One or more non-transitory computer-readable storage media storing one or more sequences of instructions which, when executed using one or more processors, cause the one or more processors to: using a script automation processor that is hosted using a virtual compute instance and a virtual storage instance associated with one or more second non-transitory computer-readable storage media storing one or more second sequences of instructions defining an API implementation of the API, a graph server, and one or more programming language runtime interpreters, receiving a user pipeline automation script comprising one or more first sequences of instructions specifying one or more API calls to an application programming interface (API), and a user application; using the script automation processor, creating and storing one or more programmatic containers in memory of the script automation processor, the containers corresponding to functions that user pipeline automation script and user application invoke; using the script automation processor, creating and storing a directed acyclic graph (DAG) in the memory of the script processor, the DAG comprising nodes and edges corresponding to dependencies of the containers; using the script automation processor, interpreting the user pipeline automation script using a particular programming language runtime interpreter among the one or more programming language runtime interpreters; using the script automation processor, running the user pipeline automation script to automatically build, test, or deploy the user application in a cloud computing service.

22. The non-transitory computer-readable storage media of clause 21, further comprising sequences of instructions which when executed cause running the user pipeline automation script by executing one or more GraphQL queries against the API implementation.

23. The non-transitory computer-readable storage media of clause 21, the script automation processor further comprising two or more programming language runtime interpreters, wherein each programming language runtime interpreter among the two or more programming language runtime interpreters is programmed to interpret a different programming language used in the user pipeline automation script.

24. The non-transitory computer-readable storage media of clause 21, wherein the user pipeline automation script further comprises the first sequences of instructions specifying one or more API extensions, the non-transitory computer-readable storage media further sequences of instructions which when executed cause installing the one or more API extensions in association with the API implementation, and during the running, based on the user pipeline automation script, invoking one or more of the one or more API extensions as part of automatically building, testing, or deploying the user application in the cloud computing service.

25. The non-transitory computer-readable storage media of clause 24, further comprising sequences of instructions which when executed cause executing each of the one or more API extensions in a sandboxed region of the main memory of the script automation processor.

26. The non-transitory computer-readable storage media of clause 24, each of the one or more API extensions comprising sequences of instructions that are executable as part of the API implementation to interoperate with any one or more of Yarm, Netlify, Git, OCI, Vecel, and Alpine Linux.

27. The non-transitory computer-readable storage media of clause 21, wherein each of the sequences of instructions for creating and storing comprise sequences of instructions which when executed cause invoking a container build utility.

28. The non-transitory computer-readable storage media of clause 21, wherein the user pipeline automation script further comprises a workflow configuration in a markup language.

29. The non-transitory computer-readable storage media of clause 21, wherein the user pipeline automation script further comprises at least one reference to a software development kit (SDK), and wherein the script automation processor comprises an SDK interface responsive to function invocations via the at least one reference.

30. The non-transitory computer-readable storage media of clause 21, wherein the SDK is programmed to run one or more of Go, Typescript, and Bash to generate one or more client stubs of a build workflow.

2. Structural & Functional Overview 2.1 Distributed Computer System Example

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of computer-implemented software application pipeline automation. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

Embodiments provide computer-implemented methods and a distributed system of executable software elements to automate workflows so that developers can spend less time fixing artisanal scripts, and more time building. Embodiments make it easy to simplify and modularize existing scripts and to replace them with a modern API and complete developer toolbox.

In one embodiment, a script automation processor is programmed to interpret user scripts including calls to predefined functions, and to automatically create and manage a plurality of containers, organized in a directed acyclic graph or DAG, to reflect dependencies in scripts and user applications. The predefined functions are exposed using an API of the script automation processor, which implements the API functions and can respond to calls of user scripts to execute specified functions. The script automation processor API is a GraphQL-compatible API for composing and running powerful pipelines with minimal effort. The use of GraphQL queries in part for API access for pipeline automation is unique to this disclosure. By relying on the script automation processor API to do the heavy lifting, one can write a small script that orchestrates a complex workflow, knowing that it will run in a secure and scalable way out of the box, and can easily be changed later as needed. Developers can write an API extension to add new capabilities to the script automation processor API. API extensions are a key differentiating feature of the script automation processor of this disclosure. API extensions ensure that as a workflow grows and evolves, it can remain simple and small, by breaking up its logic into reusable components. API extensions are fully sandboxed, so they can be safely shared and reused between projects. Client workflows may depend on extensions, and extensions may depend on other extensions. Furthermore, embodiments are language-agnostic and can interoperate with scripts written in Javascript, Go, Typescript, and other scripting languages using a language runtime as an adapter.

To execute the instantiation and management of containers to run user applications, one embodiment interoperates with BUILDKIT, a container build utility, to create and build container images. BUILDKIT is commercially available at the time of this writing from Docker, Inc., Palo Alto, California, and is described at the time of this writing at: https://docs.docker.com/develop/develop-imagesibuild_enhancments/. BUILDKIT provides primitive functions that can be called to conduct container management, and its use is illustrated herein for convenience. However, any container runtime can be used, such as containerD.

In an embodiment, the computer system 100 primarily includes a user computer 101, script automation processor 104, and cloud computing service 120. The user computer 101 is associated with a user or enterprise, represented by workflow developer 202, that has authored a user application 114 to be deployed to one or more computers or data centers, including for example one or more virtual compute instances and one or more virtual storage instances of the cloud computing service 120. Examples of cloud computing service 120 can include AMAZON AWS, MICROSOFT AZURE, GOOGLE CLOUD, and others.

User computer 101 also authors, creates, and stores a user pipeline automation script 110, which can be stored locally or in virtual storage of cloud computing service 120 in association with a cloud service account of the user or an enterprise. In an embodiment, user pipeline automation script 110 comprises script code defining one or more API calls 112, optionally one or more API extensions 116, and a reference 117 to a software development kit ("SDK"). Detailed examples of these elements are provided in other sections herein.

Each of the API calls 112 and API extensions 116 is programmed to call API implementations 106 of script automation processor 104; similarly, the SDK reference 117 causes invoking and/or linking or incorporating an SDK interface 118 of the script automation processor by which the script automation processor uses one or more programming language runtime interpreters 108A, 108B to interpret script code of the user pipeline automation script 110, which can be written in any of several different programming languages, each being compatible with a different one of the programming language runtime interpreters. Examples of programming languages that the programming language runtime interpreters 108A, 108B can be programmed to interpret, in different embodiments, including GO, Typescript, and Bash.

The script automation processor 104 executes using one or more virtual compute instances and virtual storage instances of cloud computing service 120. The API implementations 106 comprise proprietary code to interoperate with cloud computing service 120 and a container build utility 102 to build and deploy the user application 114 to the cloud computing service. In an embodiment, the container build utility 102 is programmed to create and store, in the main memory of the virtual compute instance(s) that host the script automation processor 104, a directed acyclic graph ("DAG") 130 of container nodes 132, 134, 136. Each of the container nodes 132, 134, 136 comprises metadata for managing a corresponding programmatic container, such as a DOCKER container. One or more of the API implementations 106 is programmed to interoperate automatically with the container build utility 102 to create such containers as are needed to instantiate and execute the user application 114, including any dependencies, and user pipeline script 110, including any dependencies, in cloud computing service 120. With this architecture, the user computer 101 does not need to manage container instantiation, dependencies, or tear-down directly, as the script automation processor 104 acts as a manager.

For purposes of clearly illustrating one example, in some sections of this disclosure, the shorthand term or label DAGGER or "dagger" refers to the source of a script automation processor 104 and/or one or more of its functional elements. The term or label DAGGER or "dagger" is used merely for convenience to enable referencing the source of code files, paths, directories, and other programmatic constructs using a short word. Other embodiments can implement functionally similar code from other sources having terms, labels, or names other than DAGGER or "dagger." Similarly, to illustrate a simple user application or app, certain sections of the disclosure use the term TODO or "to do" to identify and signify the functions of an example application. The TODO app could be programmed, for example, to create a "things to do" list of tasks or projects and enable viewing and editing of the tasks. Other embodiments can interoperate with any other substantive user application and the TODO app is presented merely to show one example of how user code can be integrated into and/or interoperate with functional elements of the disclosure.

Once scripts have been created and integrated with API calls and modularized using extensions to move reusable code to the API, with automatic container management, thus moving more and more code to the API and keeping the artisanal query to a manageable size, the automation logic associated with a query can be shared among different teams in the same enterprise or in a different enterprise. In an embodiment, an extension not relating to an external service like Yarn or Netlify can be authored and shared with others. These extensions include elements of a GraphQL server and can extend data types and define new API calls. In this manner, one development team can write scripts that load and use extensions that a different team created to implement generic functions that are usable across different substantive applications. Importantly, extensions are sandboxed and must be expressly loaded and associated in a pipeline with other functions of a script. This makes user extensions as safe as loading Go packages, for example.

2.2 Example Data Processing Flows

Embodiments can be used in at least four ways: writing a workflow; running a workflow; exploring the API; and writing an API extension. Each is described in the following sections.

2.2.1 Writing a Workflow

Figure 2:
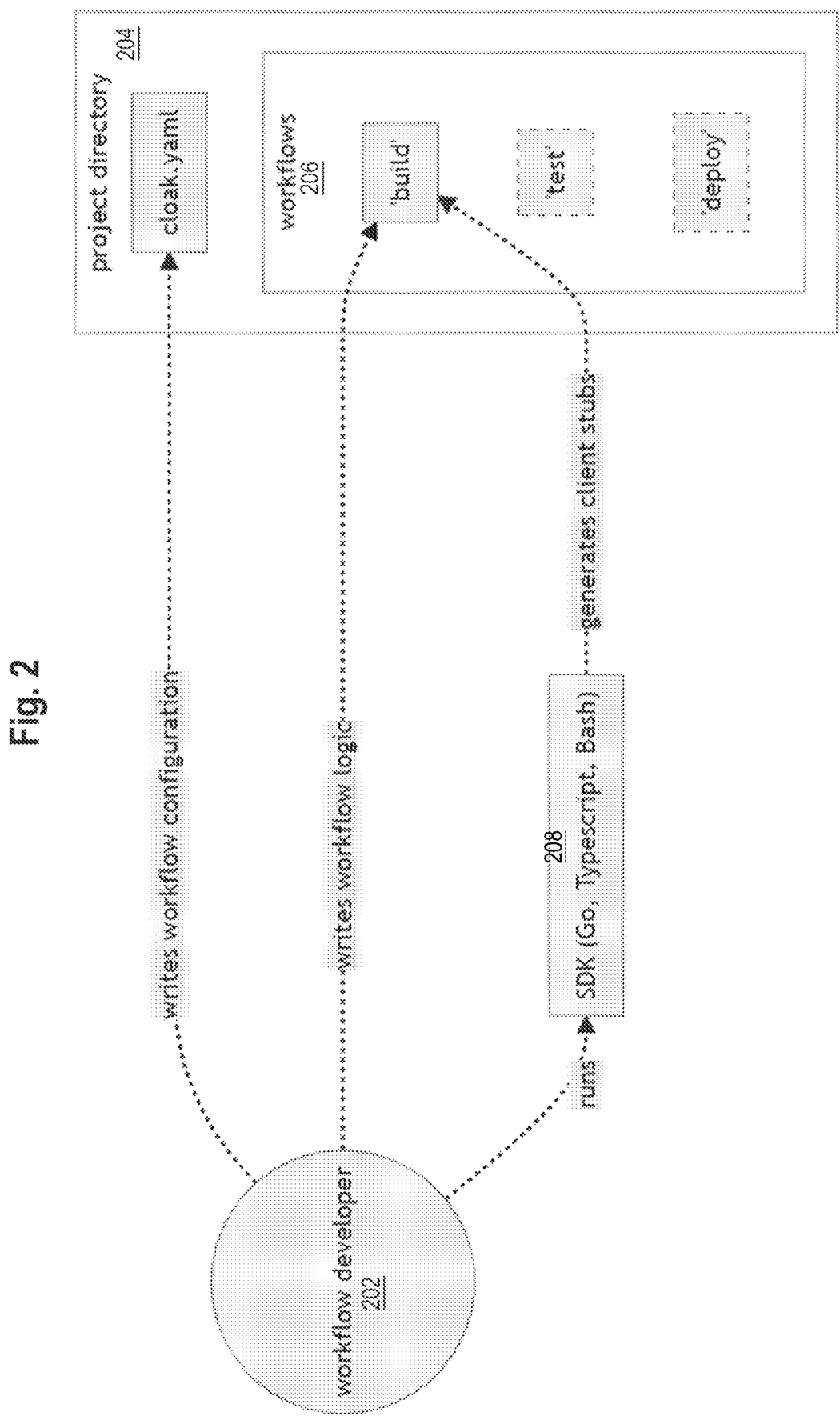
FIG. 2 illustrates an example process for writing and running a workflow.

FIG. 2 illustrates an example process for writing and running a workflow. FIG. 2 and each other flow diagram herein are intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

As shown in FIG. 2, in an embodiment, a workflow developer 202 writes a workflow configuration, which is stored in a project directory 204, using a code repository service like GIT or using the cloud computing service 120 for storage. In some embodiments, the workflow configuration can be expressed in a markup language like YAML; for example, the file name "dagger.yaml" or "cloak.yaml" can be used as shown in FIG. 2 as an example. A file like "dagger.yaml" or "cloak.yaml" can provide a configuration interface to load extensions but is not required in all embodiments, as not all embodiments need to use extensions. The workflow developer also writes workflow logic, which can be expressed using script code to define one or more workflows 206. Workflows 206 can specify application build, test, and/or deploy operations. The workflow developer 202 also runs the completed workflow, which references and links to a software development kit ("SDK") 208 to thereby interpret and run code in the workflow logic using one of a plurality of different available programming language interpreters or runtimes. As a result, the SDK generates client stubs for build, test, and/or deploy operations.

In an embodiment, for script automation processor 104, workflow 206 comprises software instructions that call the API implementations 106. A workflow 206 can be written in any programming language for which an SDK interface 118 to the SDK 208 is available. The SDK interface 118 is programmed to facilitate the initialization of the script automation processor 104 and to generate client code that hides GraphQL queries behind a more familiar API, for convenience, so the developer does not need to directly deal with GraphQL. A workflow 206 may declare a dependency on API extensions, using the dependencies configuration key.

The following example code illustrates installing the SDK with a Go application and creating a Go continuous integration tool that builds a Go application for multiple architectures and Go versions using the Go SDK. Equivalent functionality is possible using other languages such as Python or Node, which uses Javascript and Typescript. The examples in this section assume that the reader understands the Go programming language; many external publications and tutorials are available. The examples also assume that the user has a Go development environment and the Docker container system installed and available on the host system. In an embodiment, in a Go application, a build( ) function can integrate with elements of the SDK as shown in the following example, which can comprise code stored in a main.go file for the application:

```
package main
import (
  "context"
  "fmt"
  "os"
  "dagger.io/dagger"
)
func main( ) {
  if err := build(context.Background( )); err != nil {
    fmt.Println(err)
  }
}
func build(ctx context.Context) error {
  fmt.Println("Building with Dagger")
  // initialize Dagger client
  client, err := dagger.Connect(ctx, dagger.WithLogOutput(os.Stdout))
  if err != nil {
    return err
  }
  defer client.Close( )
  // get reference to the local project
  src := client.Host( ).Directory(".")
  // get 'golang' image
  golang := client.Container( ).From("golang:latest")
  // mount cloned repository into 'golang' image
  golang = golang.WithMountedDirectory("/src", src).WithWorkdir("/src")
  // define the application build command
  path := "build/"
  golang = golang.WithExec([ ]string{"go", "build", "-o", path})
  // get reference to build output directory in container
  output := golang.Directory(path)
  // write contents of container build/ directory to the host
  _, err = output.Export(ctx, path)
  if err != nil {
    return err
  }
  return nil
}
```

The build( ) function begins by creating a Dagger client with dagger.Connect( ). It uses the client's Host( ) Directory( ) method to obtain a reference to the current directory on the host. This reference is stored in the src variable. It initializes a new container from a base image with the Container( ) From( ) method and returns a new Container structure. In this case, the base image is the golang:latest image. It mounts the filesystem of the repository branch in the container using the WithMountedDirectory( ) method of the Container. The first argument is the target path in the container, or /src in this example. The second argument is the directory to be mounted; in this example, it is the reference previously created in the src variable. The build( ) function also changes the current working directory to the /src path of the container using the WithWorkdir( ) method and returns a revised Container with the results of these operations. The build( ) function further uses the WithExec( ) method to define the command to be executed in the container; in the example, the command "go build -o PATH" is used, where PATH refers to the build/ directory in the container. The WithExec( ) method returns a revised Container containing the results of command execution. The build( ) function obtains a reference to the build/ directory in the container with the Directory( ) method. And the build( ) function writes the build/ directory from the container to the host using the Directory.Export( ) method.

In response to executing a command like "go run main.go", the Go CI tool builds the current Go project and writes the build result to build/ on the host. Using the tree command can show the build artifact on the host, as shown below:

```
tree build
build
└── multibuild
```

The Go CI tool can be extended for multiple OS and architecture combinations, as shown in the following further example of a "main.go" file:

```
package main
import (
  "context"
  "fmt"
  "os"
  "dagger.io/dagger"
)
func main( ) {
  if err := build(context.Background( )); err != nil {
    fmt.Println(err)
  }
}
func build(ctx context.Context) error {
  fmt.Println("Building with Dagger")
  // define build matrix
  oses := [ ]string{"linux", "darwin"}
  arches := [ ]string{"amd64", "arm64"}
  // initialize Dagger client
  client, err := dagger.Connect(ctx, dagger.WithLogOutput(os.Stdout))
  if err != nil {
    return err
  }
  defer client.Close( )
  // get reference to the local project
  src := client.Host( ).Directory(".")
  // create empty directory to put build outputs
  outputs := client.Directory( )
  // get 'golang' image
  golang := client.Container( ).From("golang:latest")
  // mount cloned repository into 'golang' image
  golang = golang.WithMountedDirectory("/src", src).WithWorkdir("/src")
  for _, goos := range oses {
    for _, goarch := range arches {
      // create a directory for each os and arch
      path := fmt.Sprintf("build/%s/%s/", goos, goarch)
      // set GOARCH and GOOS in the build environment
      build := golang.WithEnvVariable("GOOS", goos)
      build = build.WithEnvVariable("GOARCH", goarch)
      // build application
      build = build.WithExec([ ]string{"go", "build", "-o", path})
      // get reference to build output directory in container
      outputs = outputs.WithDirectory(path, build.Directory(path))
    }
  }
  // write build artifacts to host
  _, err = outputs.Export(ctx, ".")
```
-continued
```
  if err != nil {
    return err
  }
  return nil
}
```

In this embodiment, the Go CI tool supports building the application for multiple OSs and architectures. It defines the build matrix, consisting of two OSs (darwin and linux) and two architectures (amd64 and arm64). It iterates over this matrix, building the Go application for each combination. The Go build process is instructed via the GOOS and GOARCH build variables, which are reset for each case via the Container.WithEnvVariable( ) method. It creates an output directory on the host named for each OS/architecture combination so that the build outputs can be differentiated. Executing the Go CI tool via "go run main.go" builds the application for each OS/architecture combination and writes the build results to the host. The build process runs four times, once for each combination. Each build occurs concurrently because each build in the DAG does not depend on any other. As before, using the tree command can show the build artifacts on the host:

```
tree build
build/
├── darwin
│   ├── amd64
│   │   └── multibuild
│   └── arm64
│       └── multibuild
└── linux
    ├── amd64
    │   └── multibuild
    └── arm64
        └── multibuild
```

Another common operation in a CI environment involves creating builds that target multiple versions of Go. The following example illustrates extending the Go CI tool further:

```
package main
import (
  "context"
  "fmt"
  "os"
  "dagger.io/dagger"
)
func main( ) {
  if err := build(context.Background( )); err != nil {
    fmt.Println(err)
  }
}
func build(ctx context.Context) error {
  fmt.Println("Building with Dagger")
  // define build matrix
  oses := [ ]string{"linux", "darwin"}
  arches := [ ]string{"amd64", "arm64"}
  goVersions := [ ]string{"1.18", "1.19"}
  // initialize Dagger client
  client, err := dagger.Connect(ctx, dagger.WithLogOutput(os.Stdout))
  if err != nil {
    return err
  }
  defer client.Close( )
  // get reference to the local project
  src := client.Host( ).Directory(".")
  // create empty directory to put build outputs
  outputs := client.Directory( )
```

-continued

```
    for _, version := range goVersions {
        // get 'golang' image for specified Go version
        imageTag := fmt.Sprintf("golang:%s", version)
        golang := client.Container( ).From(imageTag)
        // mount cloned repository into 'golang' image
        golang = golang.WithMountedDirectory("/src",
src).WithWorkdir("/src")
        for _, goos := range oses {
            for _, goarch : = range arches {
                // create a directory for each os, arch and version
                path := fmt.Sprintf("build/%s/%s/%s/", version, goos,
goarch)
                // set GOARCH and GOOS in the build environment
                build := golang.WithEnvVariable("GOOS", goos)
                build = build.WithEnvVariable("GOARCH", goarch)
                // build application
                build = build.WithExec([ ]string{"go", "build", "-o", path})
                // get reference to build output directory in container
                outputs = outputs.WithDirectory(path,
build.Directory(path))
            }
        }
    }
    // write build artifacts to host
    _, err = outputs.Export(ctx, ".")
    if err != nil {
        return err
    }
    return nil
}
```

This revision of the Go CI tool adds a layer to the build matrix for Go language versions. The build( ) function uses the Go version number to download the appropriate Go base image for each build. It also adds the Go version number to each build output directory on the host to differentiate the build outputs. With this example, executing "go run main.go" builds the application for each combination of OS, architecture, and version, and writes the results to the host. The build process runs eight times in this case, once for each combination; as before, the builds occur concurrently because each build in the DAG does not depend on any other build. The tree command can be used to see the build artifacts on the host, as shown below:

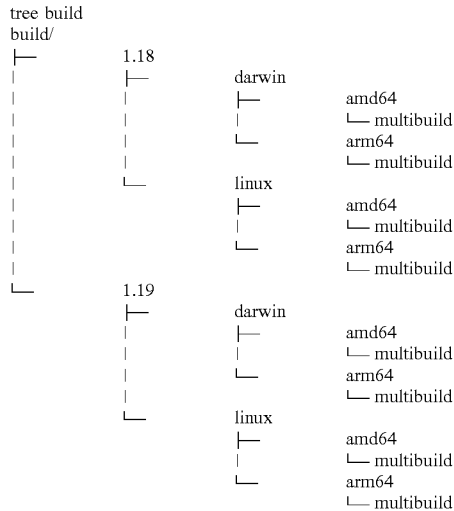

As the examples show, the SDK of embodiments allows developers to author a pipeline entirely in Go. Developers do not need to spend time learning a new language, and can immediately benefit from all the powerful programming capabilities and packages available in Go or another language. For instance, the examples use native Go variables, conditionals and error handling throughout, together with the errgroup package for sub-task parallelization.

Other GraphQL queries can be used to implement steps 3 to 7 by assembling the queries from the API building blocks using the browser or GraphQL sandbox to browse the API and copy in query code. In an embodiment, the user can use a SDK that is compatible with their programming language of choice (for example, Go, Python, Javascript, and Typescript). Each SDK is programmed to automatically translate into GraphQL queries. In this manner, the user is not required to understand GraphQL, while still gaining the benefit of its use. This example illustrates many available functions of the API implementations 106.

2.2.2 Running a Workflow

Because workflow 206 can comprise any program that calls the API implementations 106, developers can run a workflow like any other code. Therefore, user pipeline automation script 110 can reference and use the script automation processor 104 in embedded, existing projects with minimal disruption. When workflow 206 executes, the workflow calls the API implementation 106 and all extension types associated with extension code 107 are loaded and available to be queried.

Figure 3:
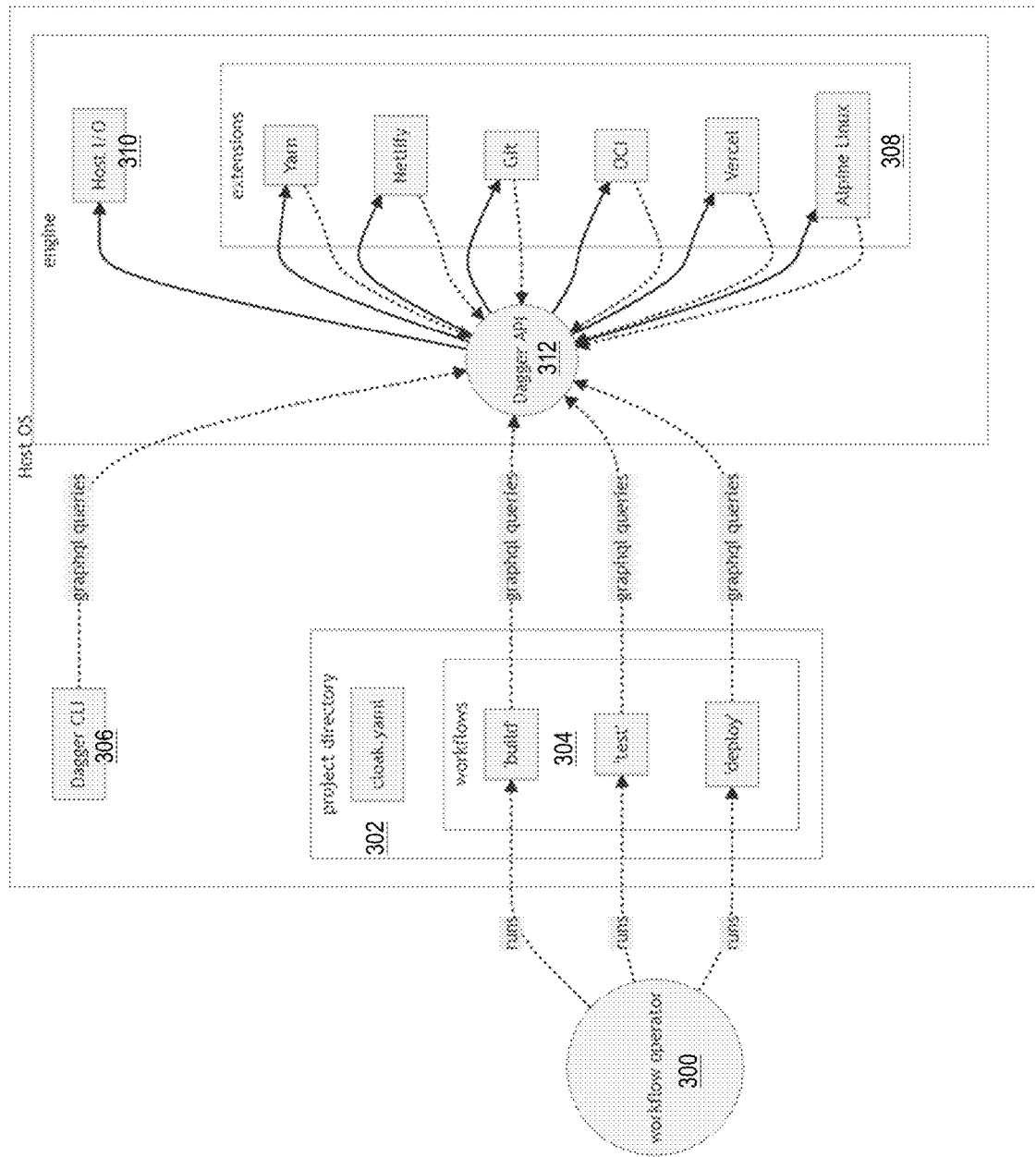
FIG. 3 illustrates programmatic operations, calls, queries, and communication paths that execute when a workflow runs, in one embodiment.

FIG. 3 illustrates programmatic operations, calls, queries, and communication paths that execute when a workflow runs, in one embodiment. In such an embodiment, a workflow operator 300 may run workflow 304 contained in a project directory 302. The workflows 304 and a Command Line Interface ("CLI") 306 (such as a Dagger CLI) may query an API 312 (such as a Dagger API), which may interface with one or more extensions 308 and a host input/output ("I/O") subsystem 310. In various embodiments, the project directory 302 may be named dagger.yaml, cloak.yaml, or using other names. Workflows 304 may include, for example, "build," "test," and "deploy" workflows. The extensions 308 may include any appropriate extensions, including (but not limited to) Yarn, Netlify, Git, OCI, Vercel, and Alpine.

2.2.3 Exploring the API

Because API implementations 106 expose API calls using GraphQL interface code, any GraphQL-compatible client can interact directly with API implementations 106. For example, a GraphQL-compatible browser can connect to and query the API implementations 106 to investigate the behavior of the implementations and calls. Thus, the use of GraphQL as an API interface mechanism, which is unique to this disclosure, enables workflow developer 202 to experiment with pipelines and/or execute pipelines for special purposes.

Figure 4:
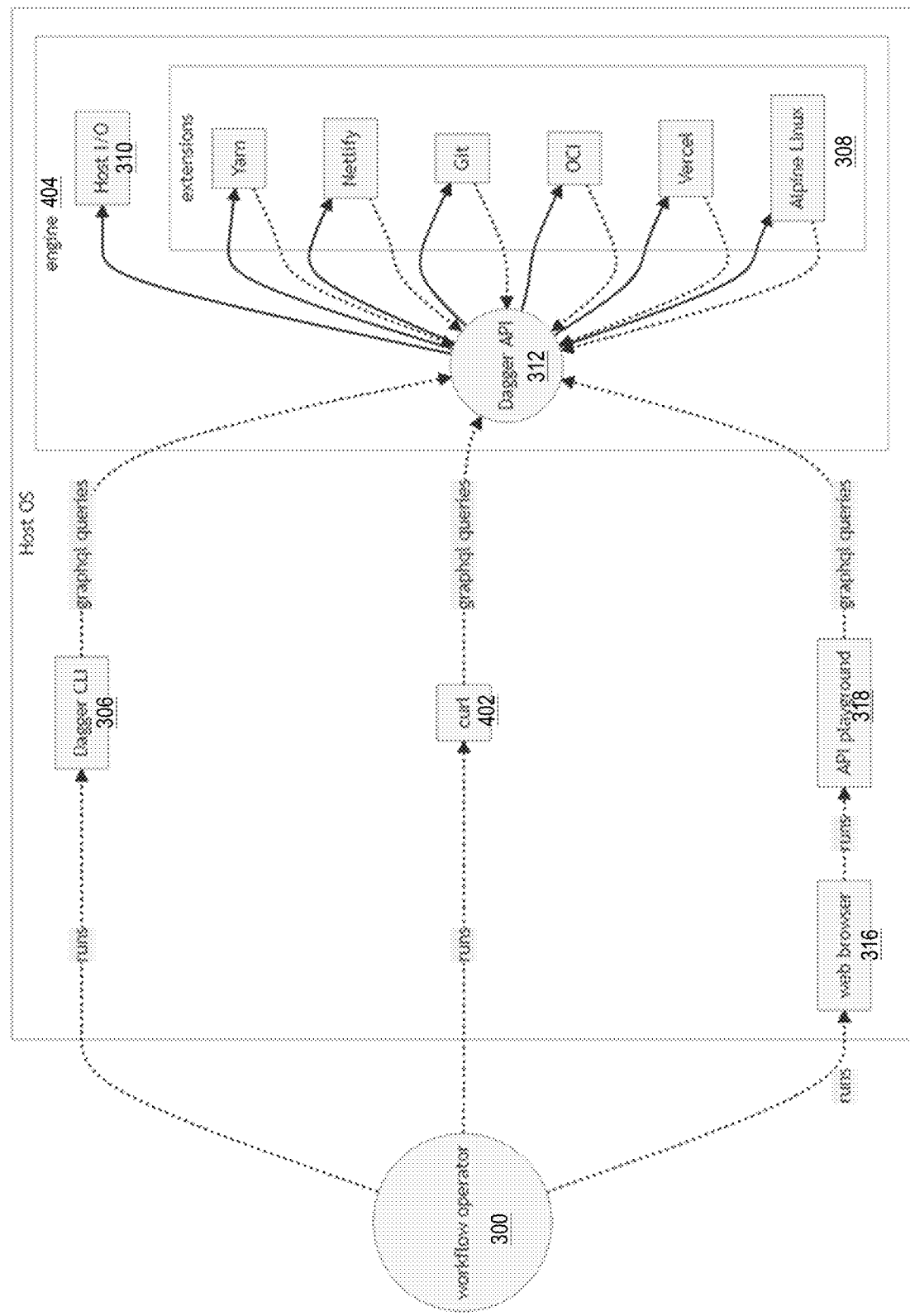
FIG. 4 illustrates programmatic operations, calls, queries, and communication paths that execute when a web browser runs queries against the API, in one embodiment.

FIG. 4 illustrates programmatic operations, calls, queries, and communication paths that execute when a web browser runs queries against the API, in one embodiment. In such an embodiment, the workflow operator 300 may direct one or more GraphQL queries to an API 312 (such as a Dagger API) via one or more of a CLI 306 , a command-line tool like "curl" 402, and an API playground 318. The API playground 318 may be run via a web browser 316. The API 312 may interface with one or more extensions 308 and a host I/O subsystem 310. The extensions 308 may include any appropriate extensions, including (but not limited to) Yarn, Netlify, Git, OCI, Vercel, and Alpine. The extensions 308, host I/O subsystem 310, and API 312 can be packaged collectively as an execution engine 404.

2.2.4 Writing an API Extension

User pipeline automation script 110 can define one or more API extensions 116 which script automation processor 104 is programmed to read and store as extension code 107 with links to appropriate calls in API implementations 106. Extensions also can extend data types that the API implementations declare or use. By using extensions, as further described, workflow developer 202 can integrate enterprise-specific logic into the API of the script automation processor 104 to make that logic available to other developers and to permit shorter, more convenient references to reusable logic. This approach moves enterprise-specific script code out of the body of the user pipeline automation script and into a location that the script automation processor 104 manages, simplifying references to and use of the code.

Extensions can be appropriate in several cases. First, an extension is useful when a workflow is growing larger and more complex and is becoming harder to develop. Second, an extension is useful when the same logic is duplicated across workflows, and there is no practical way to share it. Writing an extension is more advanced than writing a workflow because an extension is structured as a GraphQL client and implements some parts of a GraphQL server. As with workflows, extensions can be written in any language, and extensions can be written easily using references to SDK interface 118. Unlike workflows, extensions are fully sandboxed and cannot access the host system.

2.2.5 Project File Examples

As a first example, a "TODO" application will be described using an implementation with no extensions.

SCRIPT STRUCTURE. As an example, assume that workflow developer 202 is preparing an application named TODO or TODOAPP for deployment to the cloud. In a workspace of a software development environment, the workflow developer 202 may have created a set of script files, configuration files, metadata, and supporting files. Or, a pipeline can be described in a code file like main.go, build.ts, or build.py, depending on the user's preferred programming language and compatible SDK.

In an embodiment, the assets produced via a build pipeline include a file like package.json that comprises a plurality of JSON declarations, many of which may have dependencies and scripts for basic development, starting, building, testing, and/or ejecting. With access to script automation processor 104, workflow developer 202 can create a script for pipeline and deployment automation. The package.json file or a similar configuration file also can declare one or more scripts that invoke and use the API of the script automation processor 104. For example, a script written in Javascript could include the statement:

import gql, Engine from "@dagger.io/dagger";

which has the effect of making the API implementations 106 available within the script, the API being denoted as the "dagger" engine, and being implemented using GraphQL as indicated by "gql." The following code example enables sending API calls to the engine:

```
// Build todoapp, the hard way
import { gql, Engine } from "@dagger.io/dagger";
import { NetlifyAPI } from "netlify";
const engine - new (Engine({ ConfigPath:
process.env.CLOAK_CONFIG });
engine.run(asynch (client) => {
[insert API calls here]]
)}
```

This example also includes an invocation of the Netlify hosting service; other embodiments could use other hosting services. The result of a typical deployment pipeline is a URL by which the workflow developer 202 or end users can access and use the user application. Substantive calls in the [[insert API calls here]] section can be orchestrated using containers. In an embodiment, the workflow developer 202 executes a Cloak Dev command to instruct the script automation processor 104 to load a series of supporting libraries and to execute foundation functions to prepare the system for running the pipeline.

In some cases, preparing the script is facilitated by using a GraphQL sandboxed client to write GraphQL queries that eventually are moved to the script. This approach enables testing the queries in a protected environment before adding them to a script. In an embodiment, the GraphQL server 109 of script automation processor 104 implements such a sandboxed client. The script can be written to containerize functions of a pipeline by coding instructions to create containers for functions such as Yarn. While the resulting script may be long, it is modularized and easier to maintain than prior scripts because of the use of GraphQL invocations of the API implementations 106.

An example of a TODO app with extensions is now shown. The preceding example can be further modularized by moving certain functional elements into the API implementations 106 using extensions. For example:

```
workflows:
  build:
    source: ./workflows/build
    sdk: bash
    dependencies:
      - yarn
  deploy:
    source: ./workflows/deploy
    sdk: go
    dependencies:
      - yarn
      - netlify
```

As a third and more advanced example shown below, custom build and deployment logic has been moved into an extension. The workflows no longer have dependencies; a project's own extensions are always loaded. Furthermore, note that in certain embodiments, the deploy workflow may take the form of a shell script. For example:

```
workflows:
  build:
    source: build.sh
    sdk: bash
  deploy:
    source: deploy.sh
    sdk: bash
extensions:
  - source: ./dagger/extensions
    sdk: go
    dependencies:
      - yarn
      - netlify
      - aws/s3
      - git:
          remote: git@github.com:dagger/cloak.git
          ref: demov2
          path: examples/yarn/dagger.yaml
```

```
- git:
    remote: git@github.com:dagger/cloak.git
    ref: demov2
    path: examples/netlify/ts/dagger.yaml
```

In this example, declarations in the dagger.yaml configuration file use a Yarn extension and a Netlify extension to allow the reuse of complex queries relating to those systems that others can reuse. An example is provided below wherein the source code of the Netlify extension includes some types implemented in Go and other types implemented in Typescript. This project example combines two extensions. If it is used as a dependency, both extensions will often be included.

```
extensions:
  - source: ./ts
    sdk: typescript
  - source: ./go
    sdk: go
```

Queries may use Javascript stitching or other concatenation techniques to join multiple queries in a chain. An example of chained invocations of API implementations 106 after the integration of extensions is:

```
// 2. Build with yarn and deploy to Netlify
const result = await client.request (
  gql`
    query deploy{$netlifySiteName: String!,
    $netlifyTokenSecret: SecretID!) {
      host {
        workdir {
          read {
            yarn(runArgs: ["build"]) {
              netlifyDeploy{
                subdir: "build"
                siteName: $netlifySiteName
                token: $netlifyTokenSecret
              } { url }
} } } } }`
```

2.3 Example Installation and Development

INSTALLATION. In an embodiment, installation of the script automation processor 104 and related functional elements proceeds as follows. In one embodiment, workflow developer 202 initiates the specified actions, but the specified actions may also be automated via scripts that are programmed as follows. First, ensure that dagger-buildkitd is running, and invoke script automation processor 104 if it is not running. Next, build cloak and verify that it is in the correct path, for example:

```
go build ./cmd/dagger
ln -sf "$(pwd)/dagger" /usr/local/bin
```

Alternatively, create a bash alias like:

alias dagger="go run/absolute/path/to/the/dagger/repo/cmd/dagger"

This results in the file rebuilding every time in case you are making lots of changes to it.

BASIC INVOCATION. In an embodiment, a Simple Alpine LINUX script may be as follows:

```
dagger -p examples/alpine/dagger.yaml do <<'EOF'
{
  alpine {
    build(pkgs:["curl"]) {
      exec(input: {args:["curl", "https://dagger.io"]}) {
        stdout(lines: 1)
      }
    }
  }
}
EOF
```

Yarn build (output will just be encoded fs bytes for now, need to add export or shell util to the CLI interface). In an embodiment, a Yarn build script may be as follows:

dagger-p examples/yarn/dagger.yaml do --local-dir source=examples/todoapp/app --set name=build In an embodiment, a TODOApp deploy script may be as follows:

dagger-p examples/todoapp/ts/dagger.yaml do Deploy --local-dir src=examples/todoapp/app --secret token="$NETLIFY_AUTH_TOKEN"

DEVELOPMENT; Invoking Actions; With Embedded GO SDK. In an embodiment, workflow developers 202 can write a main.go implementation, similar to cmd//main.go, calls engine.Start. Such implementations may have the full flexibility of Go rather than being limited to the CLI interface shown herein. Such embedding use cases may be used from any supported language, for example, Typescript.

2.4 Writing Extensions

In an embodiment, an extension is a schema and associated resolvers that can be loaded into the script automation processor 104 at runtime to add new functionality beyond the core API. Relevant concepts include:

EXTENSION RUNTIME. An extension runtime is the part of a resolver that serves as an interface between the script automation processor 104 and the code or other artifacts that implement the actual functionality of the extension. In certain embodiments, runtimes may implement the "runtime protocol," which may define how inputs are provided to a resolver and how outputs are provided back to the script automation processor 104 server. Each runtime implementation may individually determine how the inputs are converted to outputs.

DEPENDENCY. Resolvers may declare a list of extensions they depend on; that list may determine the schema presented to the resolver by script automation processor 104 at the time the resolver is executed.

HOST CLIENT. A host client is the initiator of queries to script automation processor 104 and thus the root of a DAG. Subtypes include, but are not limited to: (1) direct GraphQL queries (for example, with Curl, a GraphQL web console, etc.); (2) CLI, comprising a command-line interface to the script automation processor 104; (3) embedded SDKs, wherein the host client is imported as a library and enables submission of queries in a way similar to implementing a resolver; and (4) client, which is distinct from the concept of a GraphQL client.

RESOLVER. A resolver is an implementation of one field of a schema. When script automation processor 104 is evaluating a query, code is run to calculate the values being requested; we call this "invoking a resolver." When an extension is loaded, each field in the extension's schema that takes arguments is associated with a resolver. Resolvers are provided to script automation processor 104 in the form of a Filesystem/ImageConfig pair. The entry point of the image config may be an executable that implements the "runtime protocol". Resolvers have access to the Cloak API during execution, which enables them to invoke other resolvers as needed.

SDK. An SDK is a collection of tools and libraries to assist in development of an extension in a given language. SDKs are distributed as extensions; they may be viewed as extensions used to create other extensions. For example, in an embodiment, the Go SDK Extension may be loaded with a Go statement such as:

```
//goibuild mage
package main
import {        "context" "fmt" "os"
                "github.com/dagger/dagger/engine"
                "github.com/dagger/dagger/sdk/go/dagger"
                "github.com/dagger/todoapp/api/magefiles/gen/core"
                "github.com/dagger/todoapp/api/magefiles/gen/netlify"
                "github.com/dagger/todoapp/api/magefiles/gen/yarn"
}
```

If the Go SDK Extension is loaded, a schema like the below may become available:

```
extend type Stubber {
    go(schema: String, dependencies: [Dependency!],
    source: Filesystem!) Filesystem!
}
extend type Runtime {
    go(source: Filesystem!, goVersion: String!) Extension!
}
```

In certain embodiments, "Extension" may be defined as part of a core. In such embodiments, a schema may be used as shown in the following example:

```
type Extension {
    schema: String!
    resolvers: Filesystem!
    dependencies: [Dependency!]
}
type Dependency {
    schema: String!
    resolvers: Filesystem!
}
```

In certain embodiments, the Alpine extension may be implemented in Go. In an embodiment, such an implementation may be performed by first writing the schema of the Alpine extension and declaring use of the Go SDK. Second, the Go SDK Extension may be loaded (for example, via a CLI generate tool or similar tools). Third, the Go stubber may optionally be invoked, thereby outputting an implementation skeleton and code-generated clients to the local directory. Fourth, the implementation of the resolvers needed for Alpine may be filled. Fifth, the implemented source code may be provided to the Go runtime resolver, which may return an extension. The extension may be loaded into the schema, thereby making the schema and resolvers available for querying. The steps presented in this paragraph are purely illustrative and non-limiting; other orders of steps may be utilized, and steps may be added or removed without departing from the scope of the present disclosure.

The stubber implementation discussed above is optional. For example, in an embodiment, a Makefile SDK may consist of a runtime like:

```
extend type Runtime {
    makefile(source: Filesystem!) Extension!
}
```

In the above schema, the source argument is a file system containing a Makefile, the returned Extension has the derived schema of the Makefile, and the filesystem contains the resolvers that will be invoked for each field of the schema.

STUBBER. A stubber is a tool used when developing resolvers that generates implementation skeletons for the runtime being used by the resolver and native clients for invoking other actions. The input to a stubber may comprise: (1) the schema of the resolver being developed; (2) the dependencies of the resolver being developed; and (3) the current implementation (if any) of the resolver. In certain embodiments, a stubber may support two optional features: (1) updating existing resolver implementations with modified schemas (of the resolver or of a dependency); and/or (2) code-first schemas. The output of a stubber is a filesystem that may be exported to the developer's local machine.

2.5 Writing Extensions in "Go"

An example of a process used to create a Dagger extension, written in Go, is provided below. For the purposes of this example, the Typescript will be referred to as "foo", and the sole action will be referred to as "bar." Specific terminology (such as "foo" and "bar") is provided below, but those skilled in the art will understand that other terminology may be used without departing from the scope of the present disclosure.

First, an extension configuration may be set up. The extension configuration may be created by making a new directory for the "bar" action. For example:

```
mkdir -p examples/foo
cd examples/foo
cp ../alpine/schema.graphql ../alpine/operations.graphql .
```

Once the directory is created, schema.graphql may be opened, and the existing build field under Alpine may be replaced with one field per action to be implemented. All occurrences of Alpine may be replaced with foo. Operations.graphql may be opened, and updates similar to those made to schema.graphql may be made to operations.graphql.

Next, a new file may be created. In one embodiment, the new file can be used to declare a first extension and any extensions upon which the first extension depends. All extensions declared in the file may be built, loaded, and made available to be called from the first extension. The "foo" file may be created in the following format:

```
name: foo
sources:
    -path: .
    sdk: go
dependencies:
    -local: ../../<dependencyA>/dagger.yaml
    -local: ../../<dependencyB>/dagger.yaml
```

In the above, <dependencyX> (e.g., <dependencyA>, <dependencyB>, or any other dependency usable above) should be replaced with the directory of the extension on which a dependency is desired. Core does not need to be declared as a dependency; it is implicitly included. In embodiments in which the sole dependency is core, other dependencies in the style above may be omitted entirely.

Next, client stubs and implementation stubs may be generated. To do so, the following may be run from examples/foo:

dagger --context= . . . / . . . -p examples/foo/dagger.yaml generate --output-dir=. --sdk=go Once the above is performed, client stubs may be visible for each dependency under gen/<pkgname> in addition to structures for needed types in models.go and auto-generated boilerplate allowing the code to be invokable in generated.go. Additionally, a main.go file with a stub implementation may exist.

Next, the desired action may be implemented by replacing the panics in main.go with the desired implementation. Dependencies may be called by importing the one or more dependencies from paths like github.com/dagger/cloak/examples/foo/gen/<dependency pkgname>.

2.6 Writing Extensions in Typescript

An example of a process used to create a Dagger extension, written in Typescript, is provided below. For the purposes of this example, the Typescript will be referred to as "foo", and the sole action will be referred to as "bar." Specific terminology (such as "foo" and "bar") is provided below, but those skilled in the art will understand that other terminology may be used without departing from the scope of the present disclosure.

First, an extension configuration may be set up. The extension configuration may be set up by copying an existing Yarn extension to a new directory for the new extension. For example:

```
cp -r examples/yarn examples/foo
cd examples/foo
rm -rf app node_modules yarn.lock
```

Next, package.json may be opened, and occurrences of dagger-yarn may be replaced with foo. Furthermore, schema.graphql may be opened, and the existing build, test, and deploy fields under Yarn may be replaced with one field per desired action. All occurrences of Yarn may be replaced with foo. Operations.graphql may be opened, and updates similar to those made to schema.graphql may be made to operations.graphql.

A new file may be created and used to declare a first extension and any extensions upon which the first extension depends. All extensions declared in this file will be built, loaded, and available to be called from the first extension.

The bar action may be implemented by editing index.ts. The Yarn field const resolver may be replaced with foo. Furthermore, the existing script field may be replaced with an implementation of the action. In certain embodiments (for example, embodiments involving the implementation of multiple actions), multiple fields may be added. In certain embodiments, an "args" parameter may be utilized, wherein the args parameter may be an object with a field for each of the input arguments to the desired action (as defined in schema.graphql). In certain embodiments, FSID may be utilized when accepting a filesystem as an input; similarly, SecretID may be utilized when accepting a secret as an input.

2.7 Command-line Interface (CLI) Implementations

Certain examples in the foregoing description have referred to using a CLI. In some embodiments, the user does not need a CLI installed to use the techniques described herein, and one code file using the Dagger SDK is sufficient to run a pipeline. However, a CLI can be used to make GraphQL queries directly from the user terminal or from a Shell script. In an embodiment, users can run pipelines from the command line by installing a system-specific CLI, then creating a shell script to build an application from a Git repository using the CLI. The methods of use of this section assume that the user has a basic understanding of shell scripting with Bash, has Bash installed in their development environment, has the jq JSON processor installed in their development environment, and has the Docker containerization system installed and running on the host system.

In an embodiment, the system-specific CLI can be installed on Windows machines via an installation PowerShell script and using PowerShell 7.0 or newer. From PowerShell, the user runs:

Invoke-WebRequest -UseBasicParsing -Uri https://dl.dagger.io/dagger/install.ps1|Invoke-Expression To install to a different location, the user can pass in a location to the script with the -InstallPath parameter.

```
$script = Invoke-WebRequest -UseBasicParsing -Uri
https://dl.dagger.io/dagger/install.ps1
$params = "-InstallPath C:\temp"
"$script $params" | Invoke-Expression
```

To install a specific version of the system, the user can pass in a version number with the -DaggerVersion parameter.

```
$script = Invoke-WebRequest -UseBasicParsing -Uri
https://dl.dagger.io/dagger/install.ps1
$params = "-DaggerVersion 0.3.6"
"$script $params" | Invoke-Expression
```

Without passing in the -InstallPath, the system will save assets under <your home folder>\dagger. Check that the system is installed correctly by opening a Command Prompt terminal and run:

where dagger
    C:\<your home folder>\dagger\dagger.exe

Next, the user can create a client in Bash. In an embodiment, the system-specific CLI offers a dagger query sub-command, which provides an easy way to send API queries to the system engine from the command line. The user can create a new shell script named build.sh and add the following code to it:

```
#!/bin/bash
alpine=$(dagger query <<EOF | jq -r .container.from.withExec.stdout
{
  container {
    from(address:"alpine:latest") {
      withExec(args:["uname", "-nrio"]) {
        stdout
      }
    }
  }
}
EOF
)
echo $alpine
```

This script invokes the query sub-command of the system-specific CLI, and passes it a GraphQL API query. This query performs the following operations: It requests the from field of the container object type, passing it the address of a container image. To resolve this, the system will initialize a container using the specified image and return a container object representing the alpine: latest container image. Next, it requests the withExec field of the container object from the previous step, passing the uname—a command to the field as an array of arguments. To resolve this, the system will return a container object containing the execution plan. Finally, it requests the stdout field of the Container object returned in the previous step. To resolve this, the system will execute the command and return a string containing the results. The result of the query is returned as a JSON object. This object is processed with jq and the result string is printed to the console.

The user can add the executable portion to the shell script and then run the script by executing the commands below:

```
chmod +x ./build.sh
./build.sh
```

The script outputs a string similar to the one below.

Linux buildkitsandbox 5.15.0-53-generic #59-Ubuntu SMP Mon Oct 17 18:53:30 UTC 2022 x86_64 Linux Next, the user can build an application from a remote Git repository. For purposes of illustrating a clear example, this section illustrates the application build process by cloning the canonical Git repository for Go and building the "Hello, world" example program from it using the system-specific CLI. First, the user can replace the build. sh file from the previous step with the version below:

```
#!/bin/bash
# get Go examples source code repository
source=$(dagger query <<EOF | jq -r .git.branch.tree.id
{
  git(url:"https://go.googlesource.com/example") {
    branch(name:"master") {
      tree {
        id
      }
    }
  }
}
EOF
)
# mount source code repository in golang container
# build Go binary
# export binary from container to host filesystem
build=$(dagger query <<EOF | jq -r
.container.from.withMountedDirectory.withWorkdir.withExec.file.export
{
  container {
    from(address:"golang:latest") {
      withMountedDirectory(path:"/src", source:"$source") {
        withWorkdir(path:"/src") {
          withExec(args:["go", "build", "-o",
          "dagger-builds-hello", "./hello/hello.go"]) {
            file(path:"./dagger-builds-hello") {
              export(path:"./dagger-builds-hello")
            }
          }
        }
      }
    }
  }
}
EOF
)
# check build result and display message
if [ "$build" == "true" ]
then
    echo "Build successful"
else
    echo "Build unsuccessful"
fi
```

This revision of the script contains two queries stitched together. The first query: requests the master branch of the Git source code repository (returned as a GitRef object); requests the filesystem of that branch (returned as a Directory object); requests the content-addressed identifier of that Directory (returned as a base64-encoded value and interpolated into the second query). The second query: initializes a new alpine:latest container (returned as a Container object); mounts the Directory from the first query within the container filesystem at the /src mount point (returned as a revised Container); sets the working directory within the container to the mounted filesystem (returned as a revised container); requests execution of the go build command (returned as a revised Container containing the execution plan); retrieves the build artifact (returned as a File); writes the File from the container to the host as a binary file named dagger-builds-hello. The return value of the final export field is a Boolean value indicating whether the file was successfully written to the host or not. This value is extracted from the GraphQL API response document using jq and evaluated with Bash.

Run the shell script by executing the command below:
./build.sh

As described above, the script retrieves the source code repository, mounts and builds it in a container, and writes the resulting binary file to the host. At the end of the process, the built Go application is available in the working directory on the host, as shown below: tree

```
├── build.sh
└── dagger-builds-hello
```

2.8 Extension Runtime Protocol

An extension runtime is a bridge between the GraphQL server 109 and executable programs implementing an extension. On a high level, the extension runtime is responsible for: receiving input from the script automation processor 104 intended for resolving a single field in a GraphQL query; based on that input, executing code that implements the resolver for that field, and returning the output of that resolver back to the script automation processor 104. The above process (described in greater detail below) is referred to as the "runtime protocol." The runtime protocol enables the otherwise highly generic, language-agnostic script automation processor 104 to dynamically plug in resolver implementations written in arbitrary languages and/or frameworks. The protocol is a way of "proxying" resolver calls out from the server to these dynamically loaded pieces of user code. It is optimized to maximize the re-usability of BuildKit caching, with each resolver call being cached based exactly on its relevant inputs. Possible examples of runtimes include: (1) a single-binary Go runtime that has been compiled with user-written extension functions, which it is instrumented to call via the Go SDK; (2) a TS runtime/TS script that dynamically loads user-written extension code (via import( )) and executes the user-written extension code; and (3) a binary Makefile runtime that shells out make commands.

When an extension is installed into the Dagger server, resolvers for each of the fields in the schema may be associated with a filesystem that contains the runtime and any resources (user code, configuration files, etc.) needed to resolve field values. The Dagger server may invoke the runtime via an LLB ExecOp in BuildKit with the below configuration:

First, an entry point (hereafter, "/entrypoint") may be executed with no arguments. /Entrypoint may be the runtime executable or may otherwise execute the runtime. In certain embodiments, standard image configuration variables associated with the filesystem may be supported, /entrypoint may be configurable, and default environment variables may be supported.

Next, a file (hereafter, "/inputs/dagger.json") may be mounted as read-only into the ExecOp with the following JSON-encoded contents: (1) a resolver that identifies the field that needs to be resolved, in the form <ObjectName>, <FieldName> (for example, if the build field of the Alpine object is being invoked, the resolver may be set to Alpine.build); (2) arguments provided to the GraphQL resolver; and (3) a parent, such as the result of the parent resolver in the GraphQL query (if any).

A directory (hereafter, "/outputs") may be mounted as read-write into the ExecOp. The runtime may write the output of the resolver. Furthermore, a Unix socket may be mounted at a location (herein, "/dagger.sock"). Connections initiated on the socket may be forwarded to a server (such as the Dagger server), thereby enabling code in the ExecOp to make appropriate API calls (such as Dagger API calls). In one or more embodiments, the root filesystem may be mounted as read-only. To allow for quick read-write scratch space when required by code in the filesystem, a tmpfs may be mounted at a location, such as /tmp.

The runtime may be expected to perform one or more of the following operations: (1) read one or more appropriate files, such as /inputs/dagger.json; (2) use the resolver value to determine which code should be executed; (3) execute the appropriate code and receive the result; (4) encode the result as json data and write the result to a location, such as /outputs/dagger.json; (5) exit with zero code if successful, and exit with non-zero code if one or more errors have occurred.

In certain embodiments, the Dagger server may submit the ExecOp to BuildKit and use ReadFile (from BuildKit's Gateway API) to obtain the contents of outputs/dagger.json. The contents of the file may be unmarshalled into a generic json object and returned as the result of the resolver. In an embodiment, the contents of the file may be directly unmarshalled into an interface { } in the Go code. Once the file is unmarshalled, the standard GraphQL execution process may take over again and continue evaluating the query.

Embodiments offer numerous improvements and benefits over prior practice. The DAG 130 of containers can reflect application dependencies, and the interoperation of script processing utility 104 with the container build utility 102 frees the developer from the details of managing containers.

3. Implementation Example—Hardware Overview

According to one embodiment, the techniques described herein are implemented by at least one computing device, which could comprise one or more virtual compute instances and virtual storage instances, the details of which are abstracted to the user or to implementations behind a virtual computing service, system, or data center. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit ("ASIC") or field programmable gate array ("FPGA") that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
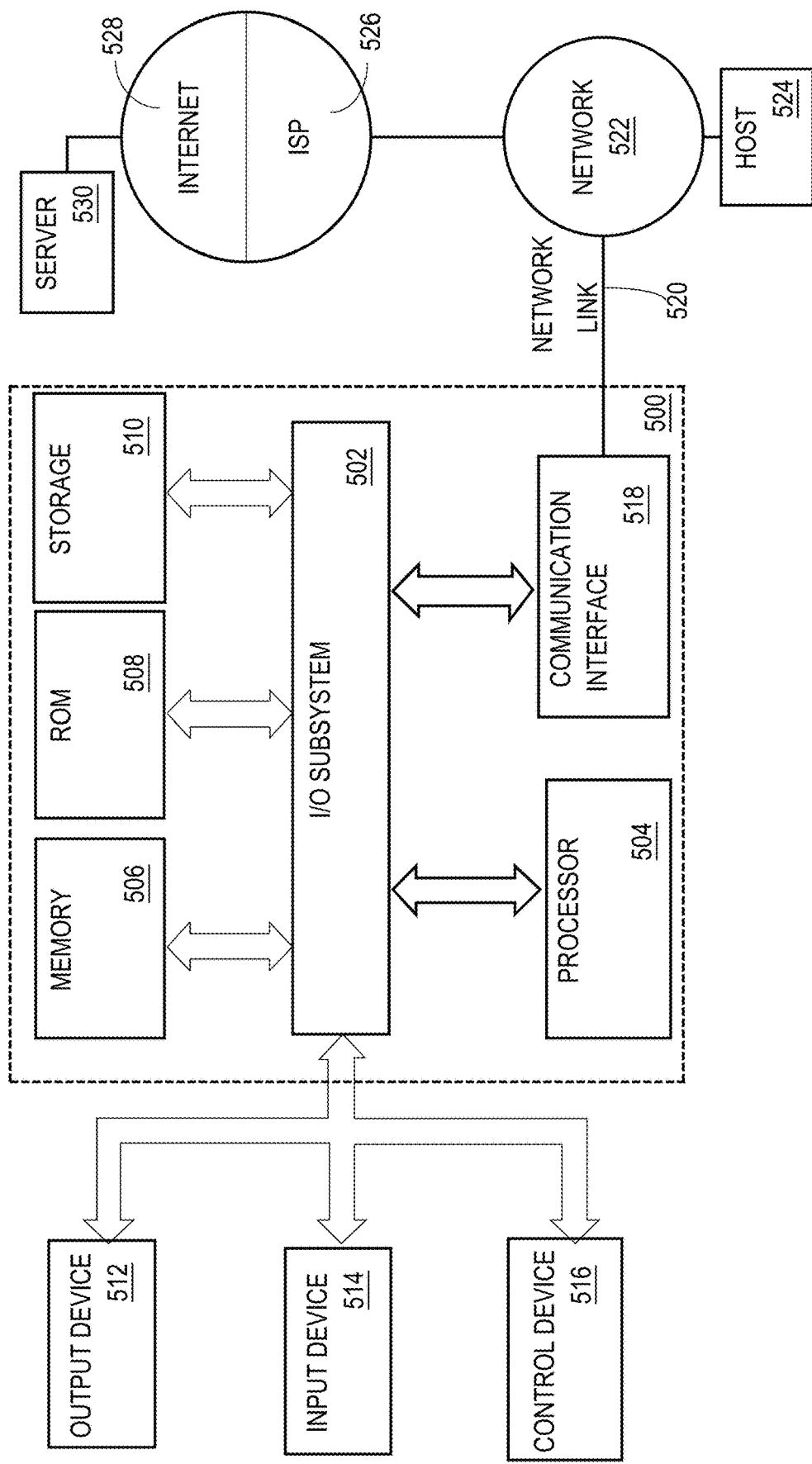
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations. In cloud-based virtual computing implementations, a virtual compute instance and a virtual storage instance can serve as abstract references that a cloud service provider implements, in a physical data center, using one or more instances of the computer system 500.

Computer system 500 includes an I/O subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit ("GPU") or a digital signal processor or ARM processor. Processor 504 may comprise an integrated arithmetic logic unit ("ALU") or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory ("RAM") or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory ("ROM") 508 or other static storage device coupled to I/O subsystem 502 for storing information and instructions for processor 504. The ROM 508 may include various forms of programmable ROM ("PROM") such as erasable PROM ("EPROM") or electrically erasable PROM ("EEPROM"). A unit of persistent storage 510 may include various forms of non-volatile RAM ("NVRAM"), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface ("GUI"), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language ("SQL") or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode ("LED") display or a liquid crystal display ("LCD") or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit ("IMU") sensors and/or various types of transceivers such as wireless, such as cellular or Wi-Fi, radio frequency ("RF") or infrared ("IR") transceivers and Global Positioning System ("GPS") transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things ("IoT") device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a GPS receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network ("ISDN") card, cable modem, satellite modem, or a modem to provide a data communication connection to a corresponding type of communications line, for example an Ethernet cable or a metal cable of any kind or a fiber-optic line or a telephone line. Network 522 broadly represents a local area network ("LAN"), wide-area network ("WAN"), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider ("ISP") 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator ("URL") strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using SQL or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system ("OS"), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   a user computer comprising a first processor coupled to one or more first non-transitory computer-readable storage media storing a user pipeline automation script comprising one or more first sequences of instructions specifying one or more application programming interface (API) calls to an API, and a user application, wherein the user pipeline automation script further comprises the first sequences of instructions specifying one or more API extensions, and wherein the user computer is coupled directly or indirectly via one or more networks to a script automation processor and a cloud computing service;
   a virtual compute instance and a virtual storage instance associated with one or more second non-transitory computer-readable storage media storing one or more second sequences of instructions wherein the script automation processor further comprises the second sequences of instructions, the second sequences of instructions defining an API implementation of the API, a graph server, and one or more programming language runtime interpreters, and which, when executed using the virtual compute instance, cause the virtual compute instance to execute:
   executing the script automation processor;
   creating and storing, by calling the API implementation, one or more programmatic containers in memory of the script automation processor, the programmatic containers corresponding to functions that the user pipeline automation script and the user application invoke;
   creating and storing a directed acyclic graph (DAG) in the memory of the script automation processor, the DAG comprising nodes and edges corresponding to dependencies of the containers;
   interpreting the user pipeline automation script using a particular programming language runtime interpreter among the one or more programming language runtime interpreters;
   running the user pipeline automation script to automatically build, test, or deploy the user application in the cloud computing service, wherein the user pipeline automation script calls the API implementation as part of automatically building, testing, or deploying the user application in the cloud computing service;
   installing the one or more API extensions in association with the API implementation;
   during the running, based on the user pipeline automation script, invoking one or more of the one or more API extensions as part of automatically building, testing, or deploying the user application in the cloud computing service.

2. The computer system of claim 1, the script automation processor further comprising the second sequences of instructions which, when executed using the virtual compute instance, cause the virtual compute instance to execute the running by executing one or more GraphQL queries against the API implementation.

3. The computer system of claim 1, the script automation processor further comprising two or more programming language runtime interpreters, wherein each programming language runtime interpreter among the two or more programming language runtime interpreters is programmed to interpret a different programming language used in the user pipeline automation script.

4. The computer system of claim 1, further comprising executing each of the one or more API extensions in a sandboxed region of the memory of the script automation processor.

5. The computer system of claim 1, each of the one or more API extensions comprising third sequences of instructions that are executable as part of the API implementation to interoperate with any one or more of Yarn, Netlify, Git, OCI, Vecel, and Alpine Linux.

6. The computer system of claim 1, wherein each of the creating and storing comprises invoking a container build utility.

7. The computer system of claim 1, wherein the user pipeline automation script further comprises a workflow configuration in a markup language.

8. The computer system of claim 1, wherein the user pipeline automation script further comprises at least one reference to a software development kit (SDK), and wherein the script automation processor comprises an SDK interface responsive to function invocations via the at least one reference.

9. The computer system of claim 8, wherein the SDK is programmed to run one or more of Go, Python, Javascript, Typescript, and Bash to generate one or more client stubs of a build workflow.

10. A computer-implemented method comprising:
    using a script automation processor that is hosted using a virtual compute instance and a virtual storage instance associated with one or more second non-transitory computer-readable storage media storing one or more second sequences of instructions defining an application programming interface (API) implementation of the API, a graph server, one or more programming language runtime interpreters, receiving a user pipeline automation script comprising one or more first sequences of instructions specifying one or more API calls to an API, and a user application, wherein the user pipeline automation script further comprises the first sequences of instructions specifying one or more API extensions;
    using the script automation processor, creating and storing, by calling the API implementation, one or more programmatic containers in memory of the script automation processor, the programmatic containers corresponding to functions that the user pipeline automation script and the user application invoke;
    using the script automation processor, creating and storing a directed acyclic graph (DAG) in the memory of the script automation processor, the DAG comprising nodes and edges corresponding to dependencies of the containers;

using the script automation processor, interpreting the user pipeline automation script using a particular programming language runtime interpreter among the one or more programming language runtime interpreters;

using the script automation processor, running the user pipeline automation script to automatically build, test, or deploy the user application in a cloud computing service, wherein the user pipeline automation script calls the API implementation as part of automatically building, testing, or deploying the user application in the cloud computing service;

using the script automation processor, installing the one or more API extensions in association with the API implementation, and during the running, based on the user pipeline automation script, invoking one or more of the one or more API extensions as part of automatically building, testing, or deploying the user application in the cloud computing service.

11. The computer-implemented method of claim 10, further comprising, using the script automation processor, running the user pipeline automation script by executing one or more GraphQL queries against the API implementation.

12. The computer-implemented method of claim 10, the script automation processor further comprising two or more programming language runtime interpreters, wherein each programming language runtime interpreter among the two or more programming language runtime interpreters is programmed to interpret a different programming language used in the user pipeline automation script.

13. The computer-implemented method of claim 10, further comprising executing each of the one or more API extensions in a sandboxed region of the memory of the script automation processor.

14. The computer-implemented method of claim 10, each of the one or more API extensions comprising third sequences of instructions that are executable as part of the API implementation to interoperate with any one or more of Yarm, Netlify, Git, OCI, Vecel, and Alpine Linux.

15. The computer-implemented method of claim 10, wherein each of the creating and storing comprises invoking a container build utility.

16. The computer-implemented method of claim 10, wherein the user pipeline automation script further comprises a workflow configuration in a markup language.

17. The computer-implemented method of claim 10, wherein the user pipeline automation script further comprises at least one reference to a software development kit (SDK), and wherein the script automation processor comprises an SDK interface responsive to function invocations via the at least one reference.

18. The computer-implemented method of claim 17, wherein the SDK is programmed to run one or more of Go, Python, Javascript, Typescript, and Bash to generate one or more client stubs of a build workflow.

19. One or more non-transitory computer-readable storage media storing one or more sequences of instructions which, when executed using one or more processors, cause the one or more processors to:

using a script automation processor that is hosted using a virtual compute instance and a virtual storage instance associated with one or more second non-transitory computer-readable storage media storing one or more second sequences of instructions defining an application programming interface (API) implementation of the API, a graph server, one or more programming language runtime interpreters, receiving a user pipeline automation script comprising one or more first sequences of instructions specifying one or more API calls to an API, and a user application, wherein the user pipeline automation script further comprises the first sequences of instructions specifying one or more API extensions;

using the script automation processor, creating and storing, by calling the API implementation, one or more programmatic containers in memory of the script automation processor, the programmatic containers corresponding to functions that the user pipeline automation script and the user application invoke;

using the script automation processor, creating and storing a directed acyclic graph (DAG) in the memory of the script automation processor, the DAG comprising nodes and edges corresponding to dependencies of the containers;

using the script automation processor, interpreting the user pipeline automation script using a particular programming language runtime interpreter among the one or more programming language runtime interpreters;

using the script automation processor, running the user pipeline automation script to automatically build, test, or deploy the user application in a cloud computing service, wherein the user pipeline automation script calls the API implementation as part of automatically building, testing, or deploying the user application in the cloud computing service;

using the script automation processor, installing the one or more API extensions in association with the API implementation, and during the running, based on the user pipeline automation script, invoking one or more of the one or more API extensions as part of automatically building, testing, or deploying the user application in the cloud computing service.

20. The non-transitory computer-readable storage media of claim 19, further comprising sequences of instructions which when executed cause running the user pipeline automation script by executing one or more GraphQL queries against the API implementation.

21. The non-transitory computer-readable storage media of claim 19, the script automation processor further comprising two or more programming language runtime interpreters, wherein each programming language runtime interpreter among the two or more programming language runtime interpreters is programmed to interpret a different programming language used in the user pipeline automation script.

22. The non-transitory computer-readable storage media of claim 19, further comprising sequences of instructions which when executed cause executing each of the one or more API extensions in a sandboxed region of the memory of the script automation processor.

23. The non-transitory computer-readable storage media of claim 19, each of the one or more API extensions comprising sequences of instructions that are executable as part of the API implementation to interoperate with any one or more of Yarm, Netlify, Git, OCI, Vecel, and Alpine Linux.

24. The non-transitory computer-readable storage media of claim 19, wherein each of the sequences of instructions for creating and storing comprise sequences of instructions which when executed cause invoking a container build utility.

25. The non-transitory computer-readable storage media of claim 19, wherein the user pipeline automation script further comprises a workflow configuration in a markup language.

26. The non-transitory computer-readable storage media of claim 19, wherein the user pipeline automation script further comprises at least one reference to a software development kit (SDK), and wherein the script automation processor comprises an SDK interface responsive to function invocations via the at least one reference.

27. The non-transitory computer-readable storage media of claim 26, wherein the SDK is programmed to run one or more of Go, Typescript, and Bash to generate one or more client stubs of a build workflow.

28. A computer system comprising:
a user computer comprising a first processor coupled to one or more first non-transitory computer-readable storage media storing a user pipeline automation script comprising one or more first sequences of instructions specifying one or more application programming interface (API) calls to an API, and a user application, wherein the user pipeline automation script further comprises at least one reference to a software development kit (SDK), and wherein the script automation processor comprises an SDK interface responsive to function invocations via the at least one reference, wherein the user computer is coupled directly or indirectly via one or more networks to a script automation processor and a cloud computing service;
a virtual compute instance and a virtual storage instance associated with one or more second non-transitory computer-readable storage media storing one or more second sequences of instructions defining an API implementation of the API, a graph server, and one or more programming language runtime interpreters, and which, when executed using the virtual compute instance, cause the virtual compute instance to execute:
executing the script automation processor;
creating and storing, by calling the API implementation, one or more programmatic containers in memory of the script automation processor, the programmatic containers corresponding to functions that the user pipeline automation script and the user application invoke;
creating and storing a directed acyclic graph (DAG) in the memory of the script automation processor, the DAG comprising nodes and edges corresponding to dependencies of the containers;
interpreting the user pipeline automation script using a particular programming language runtime interpreter among the one or more programming language runtime interpreters;
running the user pipeline automation script to automatically build, test, or deploy the user application in the cloud computing service, wherein the user pipeline automation script calls the API implementation as part of automatically building, testing, or deploying the user application in the cloud computing service and wherein the SDK is programmed to run one or more of Go, Python, Javascript, Typescript, and Bash to generate one or more client stubs of a build workflow.

29. A computer-implemented method comprising:
using a script automation processor that is hosted using a virtual compute instance and a virtual storage instance associated with one or more second non-transitory computer-readable storage media storing one or more second sequences of instructions defining an application programming interface (API) implementation of the API, a graph server, one or more programming language runtime interpreters, receiving a user pipeline automation script comprising one or more first sequences of instructions specifying one or more API calls to an API, and a user application, wherein the user pipeline automation script further comprises at least one reference to a software development kit (SDK), and wherein the script automation processor comprises an SDK interface responsive to function invocations via the at least one reference;
using the script automation processor, creating and storing, by calling the API implementation, one or more programmatic containers in memory of the script automation processor, the programmatic containers corresponding to functions that the user pipeline automation script and the user application invoke;
using the script automation processor, creating and storing a directed acyclic graph (DAG) in the memory of the script automation processor, the DAG comprising nodes and edges corresponding to dependencies of the containers;
using the script automation processor, interpreting the user pipeline automation script using a particular programming language runtime interpreter among the one or more programming language runtime interpreters;
using the script automation processor, running the user pipeline automation script to automatically build, test, or deploy the user application in a cloud computing service, wherein the user pipeline automation script calls the API implementation as part of automatically building, testing, or deploying the user application in the cloud computing service and wherein the SDK is programmed to run one or more of Go, Python, Javascript, Typescript, and Bash to generate one or more client stubs of a build workflow.

30. One or more non-transitory computer-readable storage media storing one or more sequences of instructions which, when executed using one or more processors, cause the one or more processors to:
using a script automation processor that is hosted using a virtual compute instance and a virtual storage instance associated with one or more second non-transitory computer-readable storage media storing one or more second sequences of instructions defining an application programming interface (API) implementation of the API, a graph server, one or more programming language runtime interpreters, receiving a user pipeline automation script comprising one or more first sequences of instructions specifying one or more API calls to an API, and a user application, wherein the user pipeline automation script further comprises at least one reference to a software development kit (SDK), and wherein the script automation processor comprises an SDK interface responsive to function invocations via the at least one reference;
using the script automation processor, creating and storing, by calling the API implementation, one or more programmatic containers in memory of the script automation processor, the programmatic containers corresponding to functions that the user pipeline automation script and the user application invoke;
using the script automation processor, creating and storing a directed acyclic graph (DAG) in the memory of the script automation processor, the DAG comprising nodes and edges corresponding to dependencies of the containers;

using the script automation processor, interpreting the user pipeline automation script using a particular programming language runtime interpreter among the one or more programming language runtime interpreters;

using the script automation processor, running the user pipeline automation script to automatically build, test, or deploy the user application in a cloud computing service, wherein the user pipeline automation script calls the API implementation as part of automatically building, testing, or deploying the user application in the cloud computing service and wherein the SDK is programmed to run one or more of Go, Typescript, and Bash to generate one or more client stubs of a build workflow.

* * * * *